United States Patent
Van Den Brink et al.

(10) Patent No.: US 6,829,019 B2
(45) Date of Patent: Dec. 7, 2004

(54) PICTURE DISPLAY DEVICE OF THE INDEX TYPE

(75) Inventors: Hendrikus Bernardus Van Den Brink, Eindhoven (NL); Marcellinus Petrus Carolus Michael Krijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 495 days.

(21) Appl. No.: 10/094,065

(22) Filed: Mar. 8, 2002

(65) Prior Publication Data

US 2002/0125825 A1 Sep. 12, 2002

(30) Foreign Application Priority Data

Mar. 9, 2001 (EP) .............................................. 01200888

(51) Int. Cl.[7] .................................................. H04N 9/24
(52) U.S. Cl. ........................ 348/812; 313/409; 313/471
(58) Field of Search ................................ 348/810–813; 313/409, 471; 315/10, 366, 375

(56) References Cited

U.S. PATENT DOCUMENTS

| 2,739,260 A | * | 3/1956 | Lawrence .................... 313/470 |
| 2,752,420 A | | 6/1956 | Ehrich |
| 2,809,233 A | | 10/1957 | Keizer |
| 2,885,594 A | * | 5/1959 | Lesti ............................ 315/10 |
| 4,635,106 A | * | 1/1987 | Shinkai ...................... 348/812 |
| 4,635,107 A | * | 1/1987 | Turner ........................ 348/812 |
| 4,894,711 A | * | 1/1990 | Barten ........................ 348/812 |
| 5,091,718 A | * | 2/1992 | Beatty .......................... 345/22 |
| 6,479,937 B2 | * | 11/2002 | Chen et al. ................... 315/14 |

FOREIGN PATENT DOCUMENTS

| GB | 773339 | 4/1957 |
| GB | 808138 | 1/1959 |

* cited by examiner

*Primary Examiner*—Victor R. Kostak

(57) ABSTRACT

A picture display device of the index type comprises a cathode ray tube (1) and a display window with a display screen (10) having phosphor patterns comprising parallel aligned phosphor lines (R,G,B), and with an index system (20) having a plurality of index elements (21) extending substantially parallel to the phosphor lines. The electron beam(s) (6,7,8) are deflected across the display screen (10) parallel to the phosphor lines and along and across the phospor lines. The display device has no color selection electrode in front of the display screen. The phosphor lines are arranged in the color sequence A-B-C-B-A-B-C, etc., where A, B and C stand for red, green and blue phosphors or any mutation of said colors, and, in operation, the video lines overlap such that each B phosphor line is written in a single video line and each A and C phosphor line is written by two video lines.

9 Claims, 6 Drawing Sheets

PICTURE DISPLAY DEVICE OF THE INDEX TYPE

DESCRIPTION OF THE PRIOR ART

The invention relates to a picture display device comprising a cathode ray tube having a means for generating at least one electron beam, a display window with a display screen having phosphor patterns comprising parallel aligned phosphor lines, said display screen being provided with an index system comprising a plurality of index elements extending substantially parallel to the phosphor lines, and a means for deflecting the at least one electron beam across the display screen parallel to the phosphor lines to scan the display screen, the display device having no colour selection electrode in front of the display screen, and the display device comprising means for imparting video information to the at least one electron beam, the image being written in a sequence of video lines.

Picture display devices of the type described above are also called "index tubes" or 'index' display devices.

In such known index display devices, the electron beam—when impinging on an index element of an index system—generates an index signal which is indicative of the position of the electron beam with respect to said index element and/or of the shape of the electron beam. Such an index signal is measured and subsequently used in a control loop acting on the deflection and/or formation of the electron beam in order to correct the trajectory and/or shape of the electron beam when it deviates from its nominal trajectory and/or shape. The great advantage of these types of display devices over the conventional 'shadow mask' tubes is that such index tubes do not need and do not use a colour selection electrode placed immediately in front of the display screen. Such colour selection electrodes absorb part of the energy of the electron beam(s) and increase the complexity and weight of the device.

Although the known index devices work satisfactorily in many circumstances, accurate control of the electron beam position and/or shape requires a small spot size perpendicular to the scanning direction of the electron beam(s) so as to prevent overlap with neighbouring phosphor lines, which results in a loss of colour purity and thereby a loss of image quality.

SUMMARY OF THE INVENTION

It is an object of the invention to provide an index display device having an improved image quality.

To this end, the display device in accordance with the invention is characterized in that the at least one electron beam is scanned across phosphor lines, the phosphor lines are arranged in the colour sequence A-B-C-B-A-B-C, etc., where A, B and C stand for red, green and blue phosphors or any mutation of said colours, wherein, during a scan, the at least one electron beam substantially scans a single phosphor line, and, in operation, the video lines overlap such that each B phosphor line is written in a single video line and each A and C phosphor line is written by two video lines.

In known index tubes, the index system is deposited on the inner side of the display window. For instance, a line of phosphor is deposited between each pair of index elements. If an electron beam is scanned across the phosphor line, along the direction of the phosphor line, signals are induced in or by the index elements that can be used to generate feedback signals to keep the beam on track. A video frame is written one triplet at a time. Each video line follows the previous video line.

In operation, the video lines are addressed in the sequence $\{A_i, B_i, C_i\}, \{A_{i+1}, B_{i+1}, C_{i+1}\}$. The inventors have realised that one of the major problems is the required small size of the electron beam perpendicular to the phosphor lines. If the electron beam spot size grows larger than the width of the phosphor line, it will not only hit the addressed phosphor, but also the neighbouring phosphor, which will result in a loss of colour purity. The demands on the spot size limit the performance and image quality of the index tube, both in resolution and in brightness.

The invention allows an increase of the maximum allowable spot size while maintaining the overall resolution. Instead of using the A-B-C,A-B-C,A-B-C structure, the odd triplets are inverted, giving an A-B-C,C-B-A,A-B-C structure, etc. The similar neighbouring phosphor lines are combined to one phosphor line, resulting in the sequence A-B-C-B-A-B-C, etc. Most advantageously, the sequence is RGBGRGB (RED-GREEN-BLUE-GREEN-RED-GREEN-BLUE, etc.) i.e. B=Green, although other sequences (wherein, for instance, B=Blue) may be possible. This means that, at constant pitch, the average width of the phosphor lines may be increased and, at constant width of the phosphor lines, the pitch can be decreased from p to ⅔p. Since the A and C video components of two video lines are now written on the same phosphor line, effectively the resolution of these colours is halved. The resolution of the B colour is, however, not changed. The overall resolution is, however, not equally dependent on the three colours. By choosing the colour for B on which, in a particular device, the perceived resolution is most dependent (which is usually green), the overall resolution as perceived by the viewer will not deteriorate much as compared to the perceived overall resolution of known devices, while the colour purity and/or brightness will greatly improve.

Preferably, sequential video lines are addressed in operation in accordance with the scheme $\{A,B,C\}\{C,B,A\}\{A,B,C\}$, etc.

Such an addressing scheme is preferred because it is a relatively simple scheme both in addressing and in deflection.

The device for generating an electron beam may comprise a device which generates a single electron beam, but preferably the means for generating electron beams are provided for generating a central and two outer electron beams spaced apart in a direction transverse to the phosphor lines.

Using three instead of one electron beam reduces the overall scan rate (by one third) and thereby reduces the complexity of the device.

Preferably, video information relating to colour B is imparted to said central beam.

This reduces the complexity of the addressing scheme because the central beam is always directed to one colour.

Preferably, the display device comprises means for alternating the position of the outer electron beams with each video line and imparting video information to colour A to one of the outer electron beams and video information to colour C to the other one of the outer electron beams, or means for alternately imparting, with each video line, the video information to colours A and C to the outer electron beams.

The two outer beams that do not write the central (2) phosphor line will now alternate each video line between writing the one and the other colour, while the video lines are written $\{A_i,B_i,C_i\}$, $\{C_{i+1},B_{i+1},A_{i+1}\}$. The two (for instance, R and B) beams are alternated by one of the two following modes The video signal imparted to the three electron beams is unaltered, and the relative positions of the outer electron beams are moved each video line with respect to the central beam.
The two outer electron beams keep their position with respect to the central beam and the A and C video signal are swapped every video line.

It is noted that devices are known with a single electron beam (such as from U.S. Pat. No. 2,809,233) which is simultaneously scanned across three phosphor lines by wobbling the electron beam (i.e. displacing it in a direction perpendicular to the phosphor lines) very fast across the phosphor lines, so that the electron beam excites all phosphor lines during each scan. In at least one example the arrangement of the phosphor lines in this known device is the same as described above. Such a device is, however, very complicated and accurate indexing is difficult because of the wobbling. Also the different phosphor lines are separated by guard bands. These guard bands lead to a loss of intensity, because no light is produced when the electron beam passes across the guard bands. In the present invention, the electron beam(s) are scanned substantially across one phosphor line during each scan. The efficiency is therefore higher and the accuracy of indexing is improved, both of which effects lead to an improved image reproduction.

Devices are also known (such as from UK Patent specification 808,138) in which a phosphor screen is used and a colour selection electrode (a grid) is placed in front of the phosphor screen. The grid comprises two sets of wires between which, in operation, an alternating potential is supplied, which deflects the electron beams. Such a construction is complicated, requiring a colour selection electrode of intricate design and high mechanical stability and precision as well as means for providing alternating high voltage potentials. The grid must also be accurately positioned (in a stable manner) with respect to the phosphor lines.

The above-mentioned and other aspects of the invention are apparent from and will be elucidated with reference to the embodiments described hereinafter.

BRIEF DESCRIPTION OF THE DRAWINGS

In the drawings.

The Figures are not drawn to scale. Generally, identical components are denoted by the same reference numerals in the Figures.

DETAILED DESCRIPTION OF PREFERRED EMBODIMENTS

Figure 1:
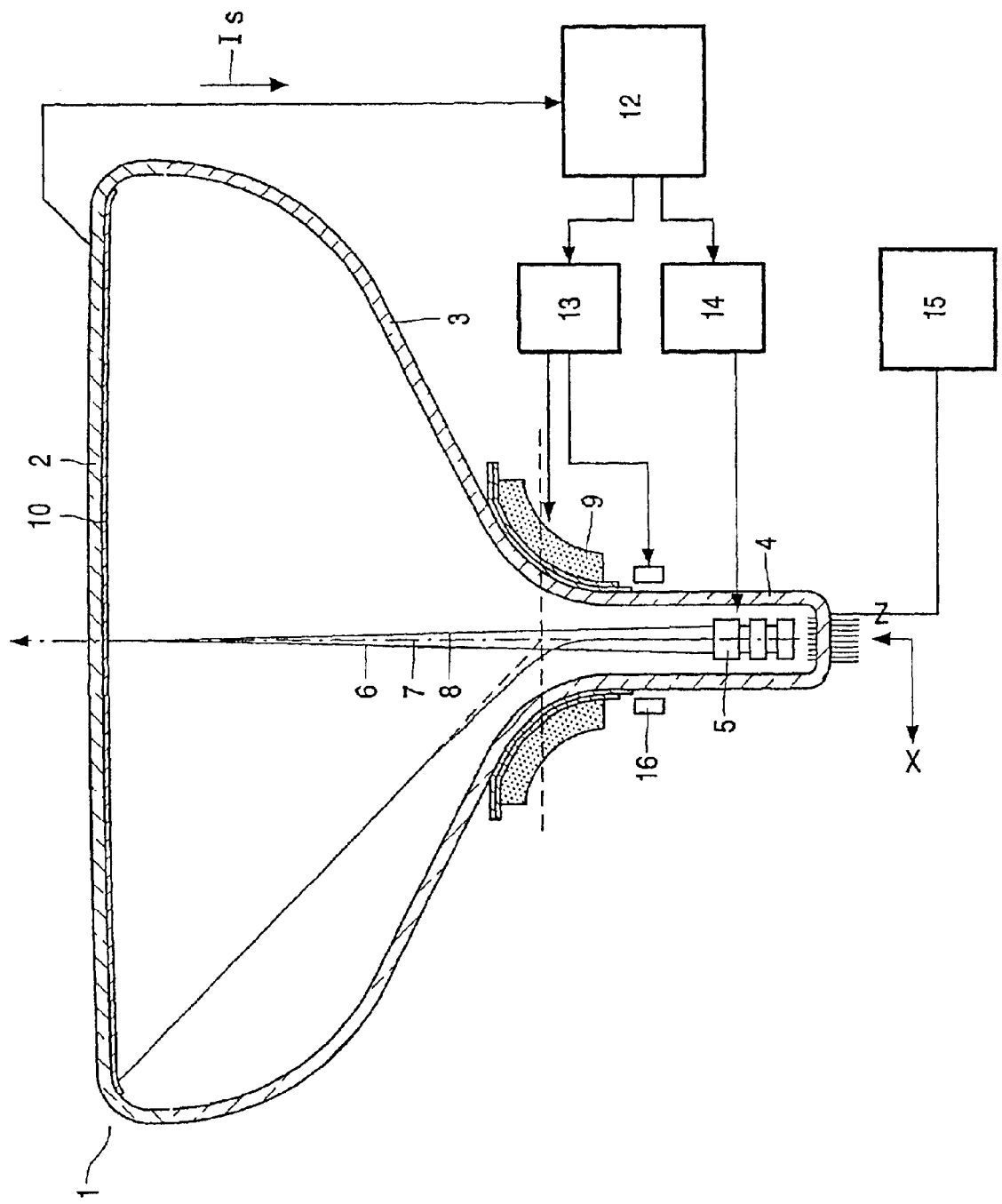
FIG. 1 shows schematically an index display device.

FIG. 1 shows an index display device comprising a colour cathode ray tube 1 having a display window 2, a cone 3 and a neck 4. The neck 4 accommodates an electron gun 5 for generating one or more, in this example three, electron beams 6,7 and 8 extending, in this embodiment, in one plane, the in-line plane. A deflection system 9 is mounted on the cone 3 for deflecting the electron beams 6,7,8 across the display window 2. A display screen 10 is situated on the inner side of the display window 2. Said display screen 10 comprises a plurality of red, green and blue-luminescing phosphor elements. Each group of (red, green or blue) phosphor elements forms a pattern. The display screen 10 may also comprise other patterns such as a black matrix (a black pattern) or colour filter patterns.

Figure 2:
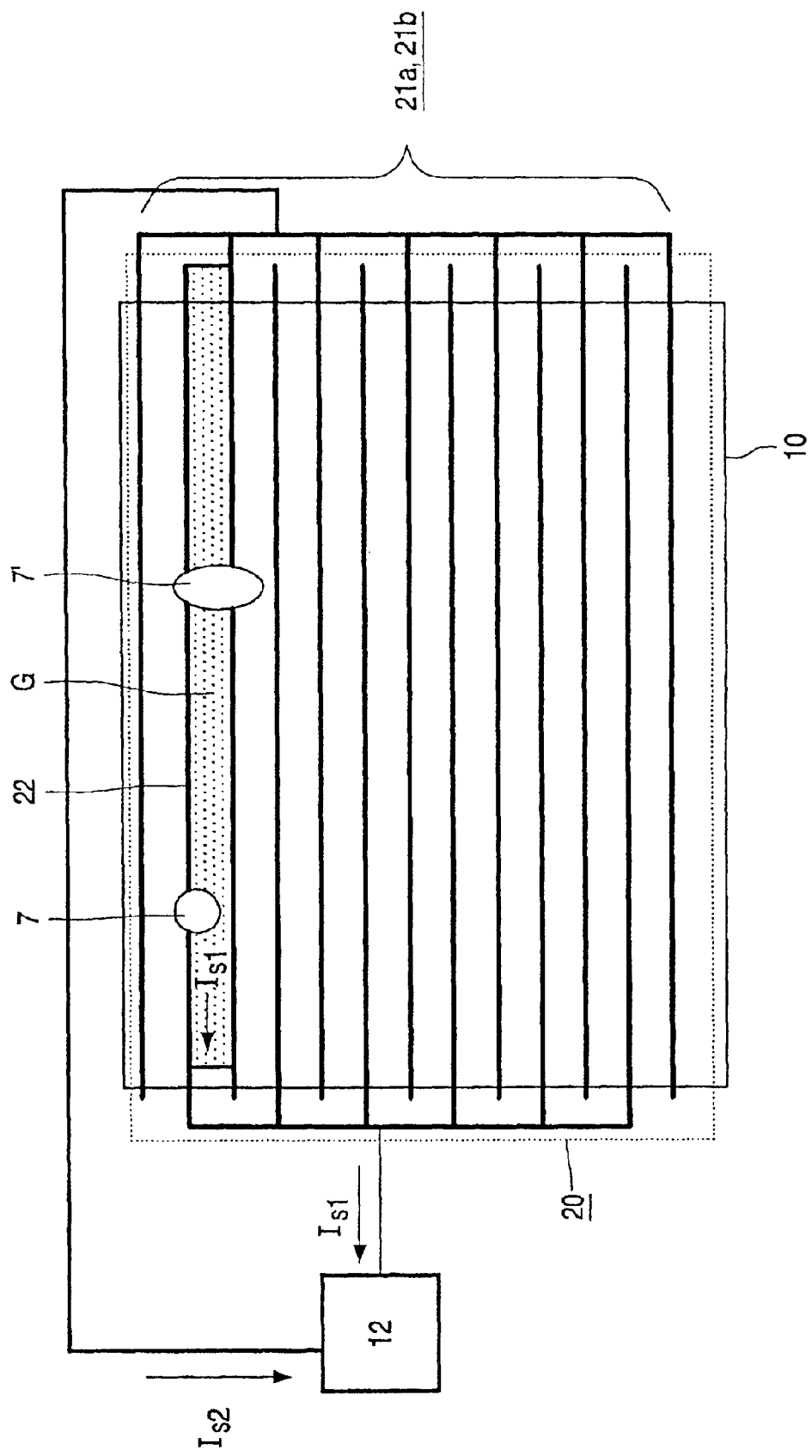
FIG. 2 shows schematically the display screen of an index display device and the index signal measurement means.
Figure 4:
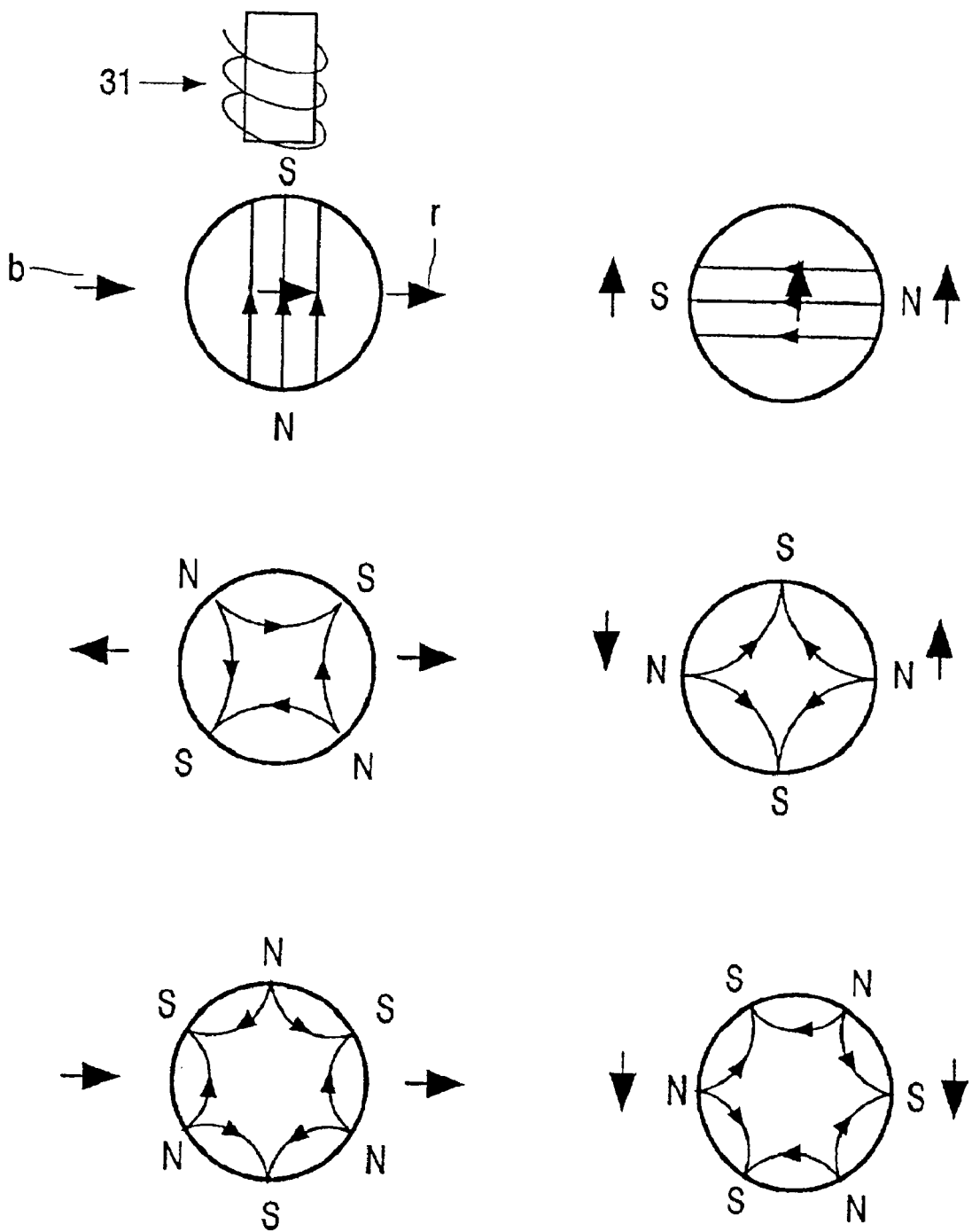
FIG. 4 schematically shows a means for effecting the relative position of the electron beams and the electromagnetic fields used for this purpose.

These patterns are provided with index electrodes, each index electrode comprising, in this example, a plurality of interconnected conducting elements. FIG. 2 shows a known index electrode 20, whose conducting elements 21 are interconnected by their same side ends. When the electron beam 7 passes across a given conducting element 22 of the index electrode 20, an index signal $I_s$ appears which is indicative of the position of the electron beam 7 with respect to the given conducting element 22 and/or of the shape of the electron beam 7. A measurement circuit 12 connected to the index electrode 20 measures this index signal $I_s$ and delivers measurement data which are used in this example by a control loop comprising a first control means 13 acting on the deflection system 9 in order to correct the trajectory of the electron beam 7 when it deviates from its nominal trajectory, and/or comprising a second control means 14 acting on the formation of the electron beam 7 in order to correct the shape of the electron beam 7 when it deviates from its nominal shape. The shape of the electron beams may be influenced for instance, by influencing the potentials supplied to the beam-forming part of the electron gun (the G1, G2 and or G3 electrodes). Alternatively or in addition, the means 13 may also act on a device 16 separately from the deflection unit to control the relative position of the electron beams, for instance by way of a means comprising electromagnets for generating a multipole field in the neck portion. Examples of such fields are illustrated in FIG. 4. The relative position of the electron beams may also be influenced in the electron gun by means of dynamic convergence electrodes. The display device also comprises means 15 for imparting video information to the electron beams as they are scanned across the phosphor lines. The index system (FIG. 2) comprises two electrodes 21a, 21b having elements 22 extending along the phosphor lines, in between which the phosphor lines (in this Figure a green phosphor line G is shown) extend. The inventors have realised that one of the major problems is the required small size of the electron beam perpendicular to the phosphor lines. If the electron beam spot size grows larger than the width of the phosphor line, it will not only hit the addressed phosphor, but also the neighbouring phosphor, which will result in a loss of colour purity. Such a situation is shown in FIG. 2 by the oval spot 7'. The demands on the spot size limit the performance and image quality of the index tube, both in resolution and in brightness in two ways the resolution of the index tube is limited because the required size of the electron beam is equal to the height of the screen divided by three times the number of video lines;
the brightness of the index tube is limited because the electron spot size is, among other things, proportional to the current in the electron beam.

The present invention provides an improved index tube.

Figure 3A:
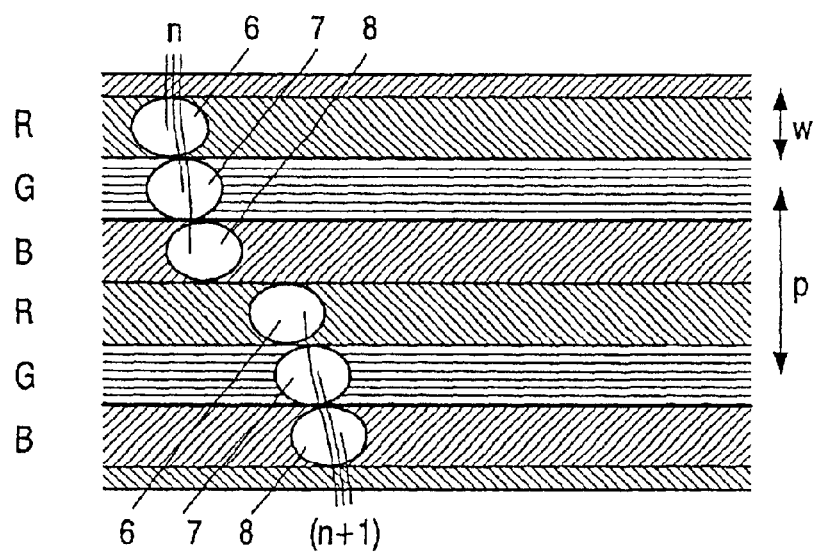
FIG. 3 schematically indicates a known phosphor pattern for a known index tube and a phosphor pattern for a tube in accordance with the invention.
Figure 3B:
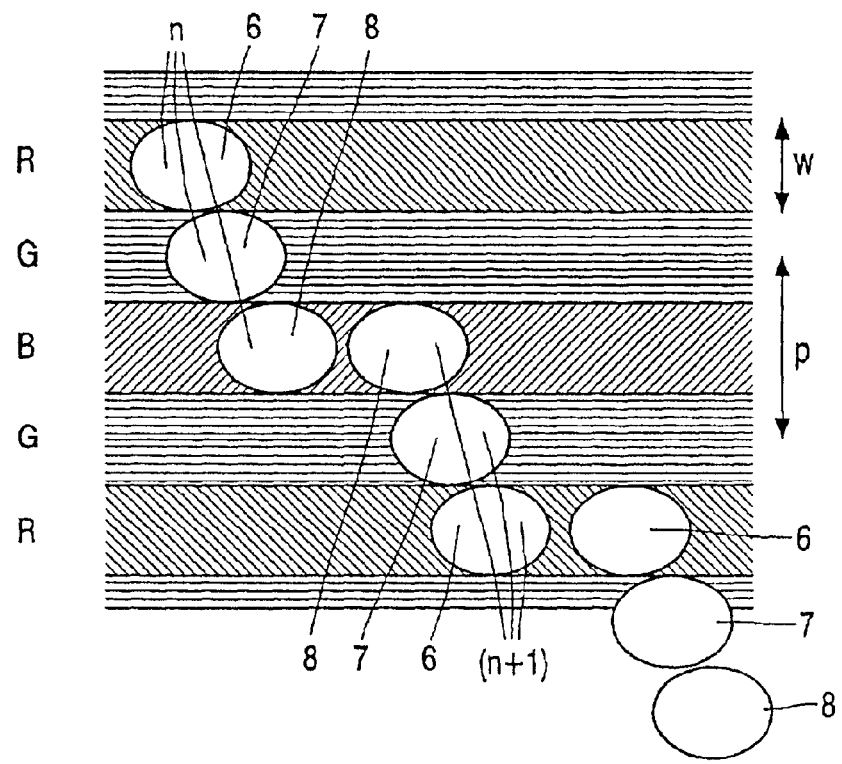

FIGS. 3A and 3B illustrate a known index tube (FIG. 3A) and an index tube in accordance with the invention (FIG. 3B), respectively. The video lines are written per triplet. Writing of lines n and n+1 is indicated schematically. The triplets may be written, for instance, by a single electron beam, in which case the single beam sequentially scans a red, a green and a blue phosphor line, or by a triplet of electron beams separated from each other in a direction transverse to the phosphor lines. The triplets are written in the known tube in the sequence RGB,RGB, etc. Instead of having an RGB,RGB,RGB structure for the phosphor lines (see FIG. 3A), the odd triplets are inverted, giving an RGB,BGR,RGB,BGR structure in the display device in accordance with the invention. The neighbouring BB and RR phosphor lines are combined, resulting in the structure RGBGRGBGR, etc. for the phosphor lines. At a constant pitch p, this means that the width of the phosphor lines (and hence the maximum spot size in a direction perpendicular to the phosphor lines) increases by a factor of 1.5. If the width of the phosphor lines remains constant, the pitch can be changed to ⅔p.

The video lines partially overlap and in this example (which is a preferred example, but further examples are given in other Figures) are written in the sequence RGB, BGR,GBR, etc., i.e. with changing, in this case alternating, sequences, while each video line overlaps with one phosphor line, i.e. by one-third. The G phosphor line is scanned in one video line, the G and R phosphor lines are scanned in two video lines.

When use is made of a single electron beam, the scanning sequence is altered each video line.

When, as in a preferred embodiment, use is made of three electron beams which are separated from each other (at the position of the phosphor screen) in a direction transverse to the phosphor lines (so that each beam is scanned substantially across one phosphor line), the two outer beams (which in this example do not write the green phosphor) preferably alternate each video line between writing the one and the other colour (i.e. Blue and Red). The video lines are again written in overlapping triplets. The outer beams can be alternated by one of the following modes:

The video signal on the three beams remains RGB,RGB and the position of the outer beams with respect to the central beam is alternated. This is schematically shown in FIG. 3B.
The two outer beams keep their position with respect to the central beam, but the video signals are swapped every video line.

Preferably, the central beam (7) is swept across the green phosphor lines. The resolution of the two outer components is reduced to some degree. Choosing the central phosphor line to be green, which is by far the brightest colour, results perceptively in only a small overall reduction of resolution.

The electron beams are separated from each other in a direction perpendicular to the phosphor lines. The phosphor lines are preferably aligned only in the line (horizontal) direction. This means that the electron beams are to be separated from each other along the vertical (frame) direction (as shown in FIGS. 3A and 3B). This can be done in the gun, for instance by using an electron gun 5 whose orientation is 90 degrees rotated with respect to the commonly used in-line electron gun, i.e. which produces three electron beams which are positioned on a line perpendicular to the line direction. Alternatively, the three electron beams can leave the electron gun in the in-line plane, as is customary practice, and the display device is provided with means, between the electron gun and the display screen, for generating electric or electromagnetic fields to change the position of the electron beams. The latter is illustrated in FIG. 4. FIG. 4 shows schematically an electromagnet 31 which produces a south pole. A similar magnet (not shown) is placed opposite magnet 31. The resulting electromagnetic field lines are shown. Such a field exerts forces on all of the three electron beams, which are indicated by arrows in the Figures. The outer (b, r) beams are indicated. The different sub-Figures illustrate fields by which all of the three beams can be moved (the upper two sub-Figures), by which the outer beams can be separated, while the middle beam remains unchanged (middle two sub-Figures) and fields by which the two outer beams can be moved in tandem (lower two sub-Figures). An arrangement or arrangements of electromagnets to produce such fields can be used to alter the position of the beams with respect to each other and to keep the beams on track.

Figure 5:
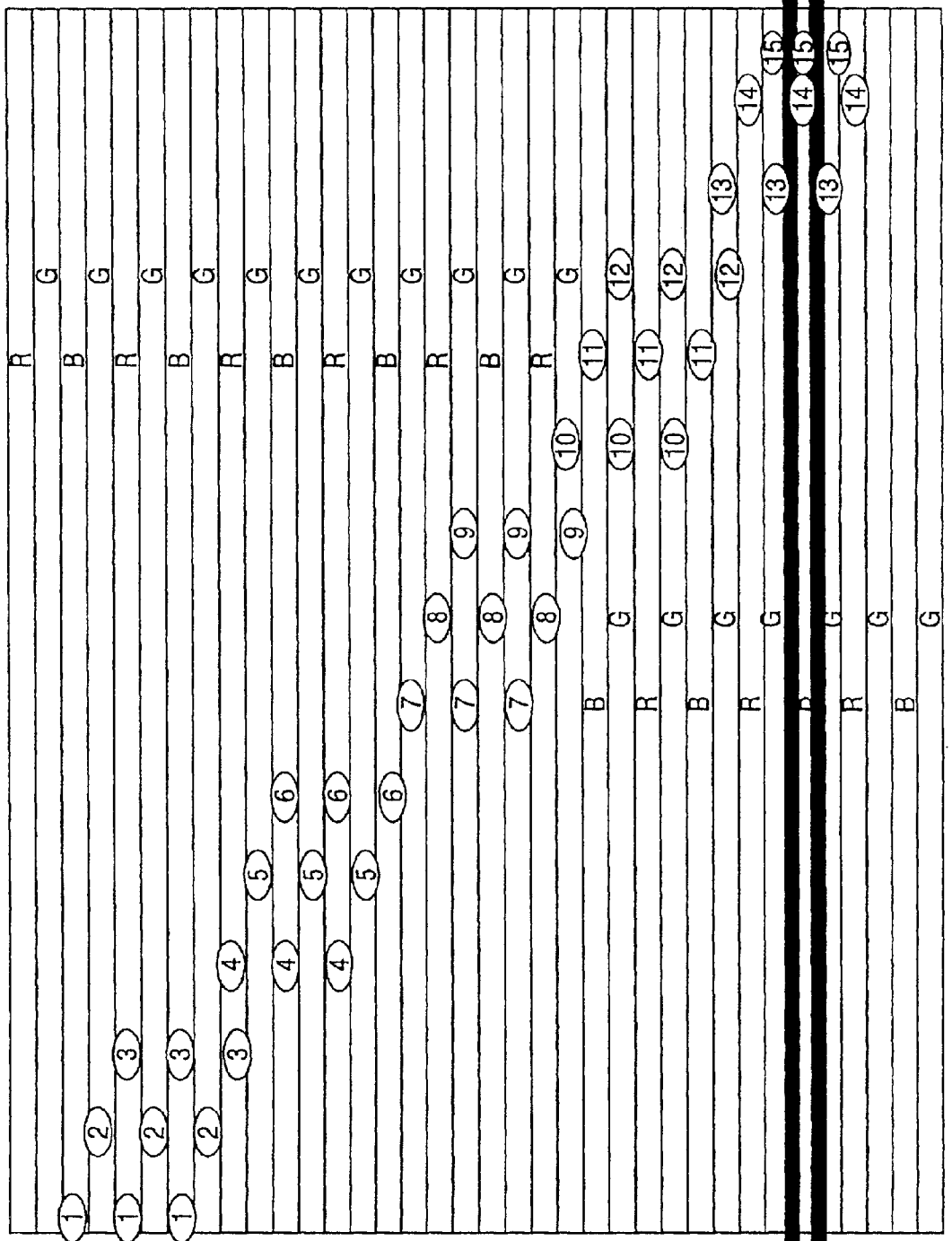
FIG. 5 illustrates an addressing scheme for a device in accordance with the invention.
Figure 6:
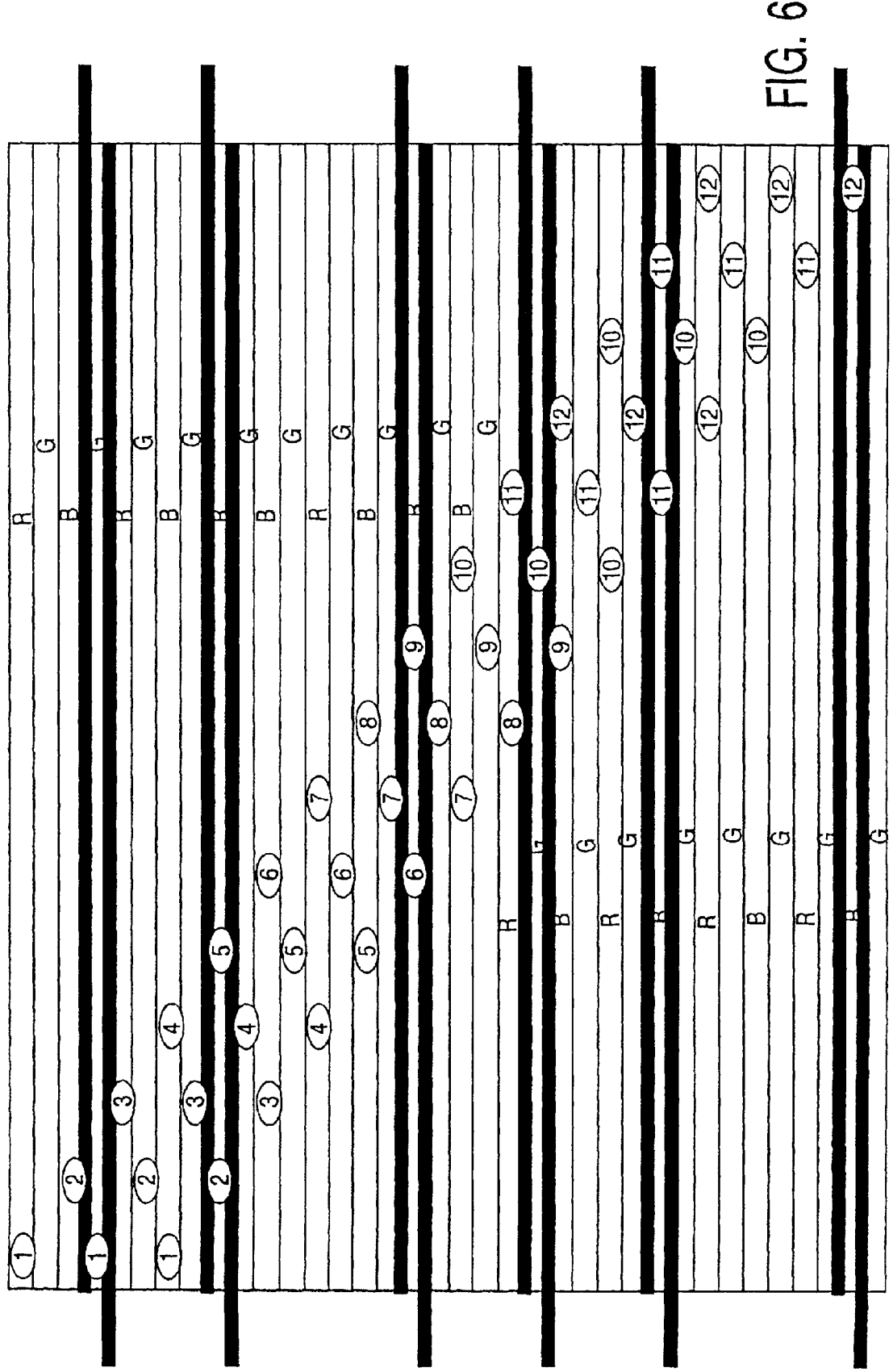
FIG. 6 illustrates an addressing scheme for a device in accordance with the invention.

FIGS. 5 and 6 illustrate two further schemes (different from the scheme shown in FIG. 3) for addressing the display device in accordance with embodiments of the invention.

FIG. 5 shows schematically the position of three electron beams, wherein it should be noted that spots 1 depict the position of the three electron beams as they are scanned horizontally, making up the first triplet (first video line), spots 2 depict the positions of the three electron beams as they are scanned horizontally, making up the second video line etc. During scanning of the first video line (51), the upper electron beam is thus scanned across a blue phosphor line, the middle one across the nearest red phosphor line and the lower one across the nearest blue phosphor line. During the second video line (52), the three electron beams are scanned across three adjacent green phosphor lines, and during the third video line (53), the upper electron beam is scanned across a red phosphor line, the middle one across the nearest blue phosphor line and the lower one across the nearest red phosphor line. Thus, the sequence is (BRB) (GGG)(RBR), etc. Each G phosphor line is scanned once in one video line, whereas each R and B phosphor line is scanned twice in two video lines. Although this scheme works, it can be seen that it is rather complicated, and the horizontal shift between the video lines is not constant. Sometimes, the shift is one phosphor line (between 1 and 2, for instance) and sometimes 4 phosphor lines (between 3 and 4, for instance). The scheme shown in FIG. 3 is less complicated. However, the scheme shown in FIG. 5 does have an advantage over the scheme shown in FIG. 3 when use is made of three electron beams, which advantage could be useful. The distance between the electron beams in a horizontal direction is increased. The close proximity of the electron beams in FIG. 3 increases the risk that the index signal is actually a mix of several signals, which complicates the analysis. This is schematically shown in FIG. 5 by video lines 14 (with a distance of two lines between the electron beam spots) and video line 15 (with a distance of one line between the electron beam spots, i.e. as shown in FIG. 3) and two indexing elements straddling the relevant green phosphor line. For video line 14 there is no interference of the outer spots on the signal, due to the larger distance between the spots. A 'clean' signal, i.e. without interference, is obtained. For video line 15, there is a considerable risk of interference because the upper and lower electron beam may hit the indexing elements.

The sequence (RGB), (BGR) is preferred because this is a less complicated scheme both in addressing and in horizontal shift.

In addition to FIG. 3 but different from the scheme shown in FIG. 3, FIG. 6 shows a further example of an addressing scheme (RGB), (BGR). In this example, the distance between the electron beams in a direction transverse to the phosphor lines does not correspond to the width of one phosphor line, as in FIG. 3, or to two phosphor lines, as in FIG. 5, but to three phosphor lines. This has an advantage as regards the index signals when three beams are used. FIG. 6 shows a possible arrangement of index electrodes. Again, each G phosphor line is scanned once during a single video line, and each R and B phosphor line is scanned twice in two video lines. During video lines 1 and 10, a 'clean signal' for the middle electron beam is obtained, during video lines 5 and 14, a 'clean signal' for the upper electron beam spot is obtained and during video lines 6 and 15, a 'clean signal' for the lower beam spot is obtained. This improves the tracking of the different colours, while improved indexing allows a better image reproduction.

It will be clear that many variations are possible within the framework of the invention. In these examples, the phosphor lines are arranged and scanned, for instance, horizontally. They may be arranged and scanned vertically in a so-called transposed scan tube. In summary, the invention can be described as follows.

A picture display device of the index type comprises a cathode ray tube (1) and a display window with a display screen (10) having phosphor patterns comprising parallel aligned phosphor lines (R,G,B), and with an index system (20) having a plurality of index elements (21) extending substantially parallel to the phosphor lines. The electron beam(s) (6,7,8) are deflected across the display screen (10) parallel to the phosphor lines and along and across the phospor lines. The display device has no colour selection electrode in front of the display screen. The phosphor lines are arranged in the colour sequence A-B-C-B-A-B-C, etc., where A, B and C stand for red, green and blue phosphors or any mutation of said colours, and, in operation, the video lines overlap such that each B phosphor line is written in a single video line and each A and C phosphor line is written by two video lines.

What is claimed is:

1. A picture display device comprising a cathode ray tube (1) having a means (5) for generating at least one electron beam (6,7,8), a display window (2) with a display screen (10) having phosphor patterns comprising parallel aligned phosphor lines (R,G,B), said display screen being provided with an index system (20) comprising a plurality of index elements (21) extending substantially parallel to the phosphor lines, and a means (9) for deflecting the electron beams (6,7,8) across the display screen (10) parallel to the phosphor lines to scan the display screen, the display device having no colour selection electrode in front of the display screen, and the display device comprising means for imparting video information to the at least one electron beam (6,7,8), the image being written in a sequence of video lines, characterized in that the at least one electron beam is scanned across phosphor lines, the phosphor lines are arranged in the colour sequence A-B-C-B-A-B-C, etc., where A, B and C stand for red, green and blue phosphors or any mutation of said colours, wherein, during a scan, the at least one electron beam substantially scans a single phosphor line, and, in operation, the video lines overlap such that each B phosphor line is written in a single video line and each A and C phosphor line is written by two video lines.

2. A picture display device as claimed in claim 1, characterized in that, in operation, the video lines are written in the sequences {A,B,C}; {C,B,A}, {A,B,C}, etc.

3. A picture display device as claimed in claim 1, characterized in that the means for generating electron beams are used for generating a central beam (7) and two outer electron beams (6,8) spaced apart in a direction perpendicular to the phosphor lines.

4. A picture display device as claimed in claim 3, characterized in that, in operation, the central electron beam is scanned across the phosphor lines B, while video information relating to colour B is imparted to said central beam.

5. A picture display device as claimed in claim 4, characterized in that the display devices comprises means for alternating the position of the outer electron beams with each video line and imparting video information to colour A to one of the outer electron beams and video information to colour C to the other one of the outer electron beams, or means for alternately imparting, with each video line, the video information to colours A and C to the outer electron beams.

6. A display device as claimed in claim 1, characterized in that colour B is green.

7. A display device as claimed in claim 3, characterized in that the electron beam spots at the phosphor screen are spaced apart by substantially the width of one phosphor line.

8. A display device as claimed in claim 3, characterized in that the electron beam spots at the phosphor screen are spaced apart by substantially the width of two phosphor lines.

9. A display device as claimed in claim 3, characterized in that the electron beam spots at the phosphor screen are spaced apart by substantially the width of three phosphor lines.

* * * * *